United States Patent
Jeansonne et al.

(10) Patent No.: US 11,316,827 B2
(45) Date of Patent: Apr. 26, 2022

(54) OPERATING MODE CONFIGURATION

(71) Applicant: HEWLETT-PACKARD DEVELOPMENT COMPANY, L.P., Houston, TX (US)

(72) Inventors: Jeffrey K. Jeansonne, Houston, TX (US); Isaac Lagnado, Houston, TX (US); Roger D. Benson, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 933 days.

(21) Appl. No.: 16/076,230

(22) PCT Filed: Apr. 24, 2017

(86) PCT No.: PCT/US2017/029200
§ 371 (c)(1),
(2) Date: Aug. 7, 2018

(87) PCT Pub. No.: WO2018/199904
PCT Pub. Date: Nov. 1, 2018

(65) Prior Publication Data
US 2021/0203633 A1    Jul. 1, 2021

(51) Int. Cl.
*G06F 1/16*          (2006.01)
*H04L 101/622*   (2022.01)
(Continued)

(52) U.S. Cl.
CPC ........ *H04L 61/6022* (2013.01); *G06F 1/1632* (2013.01); *G06F 1/266* (2013.01); *H04L 61/2038* (2013.01)

(58) Field of Classification Search
CPC ..... G06F 1/634; G06F 1/266; H04L 16/6022; H04L 61/2038
See application file for complete search history.

(56) References Cited

U.S. PATENT DOCUMENTS 7,030,860 B1    4/2006   Hsu et al.
8,326,385 B2   12/2012   Brogle et al.
(Continued)

OTHER PUBLICATIONS

Samiappan, "Making Smartphones Smarter with Capacitive Touch Sensing", EDN Network, Retrieved from Internet: https://www.edn.com/design/sensors/4441190/Making-smartphones-smarter-with-capacitive-touch-sensing, Jan. 12, 2016, 6 Pages.

(Continued)

*Primary Examiner* — Henry Tsai
*Assistant Examiner* — Christopher A Daley
(74) *Attorney, Agent, or Firm* — Brooks, Cameron & Huebsch PLLC (57) ABSTRACT

Examples relate to operating mode configuration. An apparatus may include a memory resource storing executable instructions. Instructions may include instructions to receive a message from a host computing device coupled to the apparatus. The message may include a Host Based Media Access Control Address (HBMA). Instructions may further include instructions to configure the apparatus using the HBMA in response to a determination that the apparatus is in a particular operating mode. The apparatus may further include a processing resource to execute the instructions stored on the memory resource.

12 Claims, 4 Drawing Sheets

(51) Int. Cl.
*G06F 1/26* (2006.01)
*H04L 61/5038* (2022.01)

(56) References Cited

U.S. PATENT DOCUMENTS

| | | |
|---|---|---|
| 8,406,806 B2 | 3/2013 | Wong |
| 8,577,289 B2 | 11/2013 | Schlub et al. |
| 9,023,463 B2 | 5/2015 | Lin et al. |
| 9,253,733 B1 | 2/2016 | Lee et al. |
| 9,729,431 B1 * | 8/2017 | Orr .................... H04L 45/24 |
| 10,896,266 B1 * | 1/2021 | BeSerra ................ G06F 21/57 |
| 2006/0059325 A1 * | 3/2006 | Milne ................ G06F 13/4081 |
| | | 711/200 |
| 2008/0278178 A1 | 11/2008 | Philipp |
| 2012/0075249 A1 | 3/2012 | Hoch |
| 2012/0265913 A1 | 10/2012 | Suumaki et al. |
| 2013/0063236 A1 | 3/2013 | Shin et al. |
| 2014/0002108 A1 | 1/2014 | Soo et al. |
| 2015/0016417 A1 * | 1/2015 | Dees .................... H04W 88/08 |
| | | 370/331 |
| 2015/0089032 A1 * | 3/2015 | Agarwal ............ H04L 61/2038 |
| | | 709/221 |
| 2016/0036767 A1 | 2/2016 | Gillon et al. |
| 2016/0088550 A1 * | 3/2016 | Rabii .................... H04W 48/18 |
| | | 370/310 |
| 2016/0117268 A1 | 4/2016 | Griffin |
| 2016/0226863 A1 * | 8/2016 | Wotherspoon ......... G06Q 20/18 |
| 2016/0378602 A1 | 12/2016 | Herzi et al. |
| 2017/0046289 A1 | 2/2017 | Hundal et al. |
| 2017/0090614 A1 | 3/2017 | Kuboyama et al. |
| 2018/0019925 A1 * | 1/2018 | Watanabe ............. H04L 9/0866 |
| 2021/0109884 A1 * | 4/2021 | Lagnado ............. G06F 13/4068 |

OTHER PUBLICATIONS

"USB 3.0 Gigabit Ethernet Adapter NIC w/USB Port-Black", Jul. 4, 2013, 3 pages.

* cited by examiner

OPERATING MODE CONFIGURATION

BACKGROUND

Computing networks may use network control mechanisms to control which computing devices may utilize the network. Additionally, computing devices may use external, peripheral devices, such as docks, to perform some of the functionality that was once performed on the computing device itself. As functionalities are offloaded onto peripheral devices from computing devices, network control mechanisms may expand to include the peripheral devices.

DETAILED DESCRIPTION

Mobile computing devices, such as laptops, notebooks, and the like, are becoming smaller and lighter. While this may result in increased portability and ease of use, there may also be a decrease in the availability of space on the device itself for various input/output ports. However, peripheral devices such as docks may have space available for input/output ports. As a result, input/output ports and the computing functionality performed by the ports, may be offloaded onto docks. When connected to a host computing device, such as a laptop or notebook, the dock may extend and expand the functionalities of the host computing device.

The host computing device may be part of a network. As used herein, a network refers to a set of devices, such as a host computing device, connected together for the sharing of resources, such as internet access. In some examples, a network may utilize network control mechanisms to control which devices are able to access and utilize the resources of the network. As used herein, a network control mechanism refers to a policy or set of policies used to separate authorized, or recognized, users of a network from unauthorized, or unrecognized, users of a network.

In some examples, the network control mechanism may be a whitelist. As used herein, a whitelist refers to a list of accepted or trusted entities, users, and/or devices. Presence on a whitelist may allow the entity, user, and/or device access to services and/or recognition on the network. A whitelist may include accepted usernames of users on the network, accepted applications to run on the network, and/or accepted Media Access Control (MAC) addresses of devices such as a host computing device on the network. Thus, when a host computing device with a whitelisted MAC address attempts to connect to the network, the host computing device will be recognized as authorized and be allowed access to the services on the network.

However, a peripheral device such as a dock may have a unique MAC address that serves to identify the peripheral device. The MAC address of the dock may be different than the MAC address of the host computing device. As a result, the MAC address of the peripheral device may not be on a whitelist used for network control purposes. Therefore, the peripheral device may not be able to use the all of the services available on the network because the peripheral device may not be recognized as authorized, even when connected to a host computing device with a whitelisted MAC address.

Operating mode configuration according to the present disclosure, by contrast, may allow a peripheral device to obtain full access to a network. The peripheral device may be in a particular operating mode that may allow a MAC address of the peripheral device to be overwritten with a MAC address of a host computing device. Overwriting the MAC address of the peripheral device with the MAC address of the host computing device may result in the peripheral device using a MAC address that is on the whitelist, and as a result the peripheral device may have access to the network as a trusted device.

Figure 1:
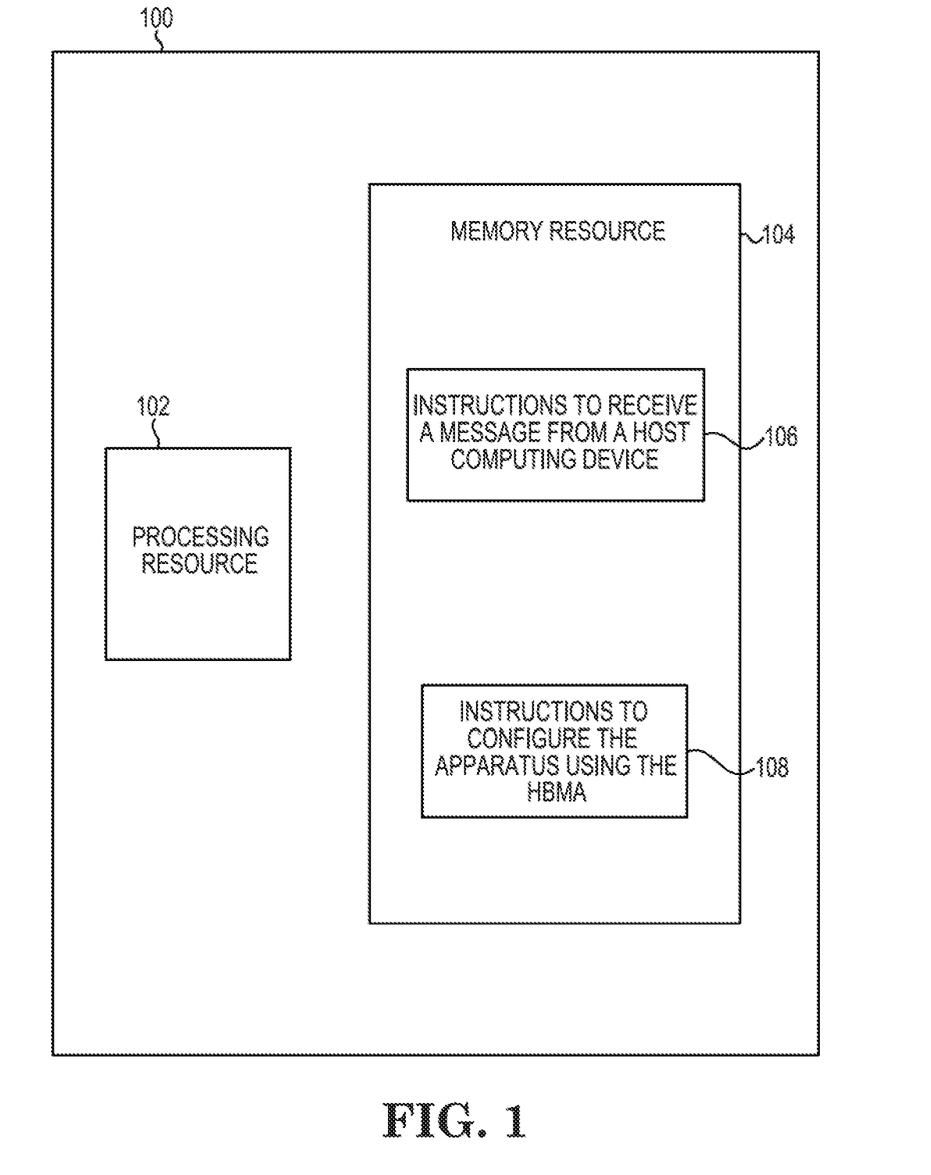
FIG. 1 is an example apparatus for operating mode configuration consistent with the disclosure.

In addition, operating mode configuration according to the present disclosure may refrain from allowing a peripheral device to receive power to components that use a MAC address to function. In some examples, the peripheral device may not receive a MAC address from the host computing device such that the MAC address of the peripheral device may not be overwritten. In such examples, the components of the peripheral device that use a MAC address may refrain from powering on. This may assist in maintaining network security because peripheral devices whose MAC addresses are not part of the whitelist may not be fully enabled on the network, FIG. 1 is an example apparatus 100 for operating mode configuration according to the present disclosure. Apparatus 100 may be a peripheral device, such as a docking device. As used herein, a peripheral device refers to an auxiliary device that may connect to and/or interface with a host computing device. Apparatus 100 may couple to a host computing device. As used herein, a host computing device can, for example, refer to a device including a processing resource, memory, and input/output interfaces for wired and/or wireless communication. For example, a client device may include a laptop computer, a desktop computer, a mobile device, and/or other wireless devices, although examples of the disclosure are not limited to such devices. In some examples, apparatus 100 may couple to a host computing device via a Universal Serial Bus (USB) Type C connector. As used herein, a USB Type C connector refers to a connector to transfer data between devices. For example, a USB Type C connector may be used to transfer data between a host computing device and an apparatus such as apparatus 100.

Apparatus 100 may include a processing resource 102. Apparatus 100 may further include a memory resource 104, on which may be stored instructions, such as instructions 106 and 108. Although the following descriptions refer to a single processing resource and a single memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

Processing resource 102 may be a central processing unit (CPU), a semiconductor based microprocessor, and/or other hardware devices suitable for retrieval and execution of instructions stored in memory resource 104. Processing resource 102 may fetch, decode, and/or execute instructions 106 and/or 108. As an alternative or in addition to retrieving and executing instructions, processing resource 102 may include at least one electronic circuit that includes electronic components for performing the functionality of instructions 106 and/or 108.

Instructions 106, when executed by processing resource 102, may cause the processing resource to receive a message from a host computing device. As used herein, a message refers to an electronic signal or communication transmitted by an electronic device, such as a host computing device. In some examples, the signal may be transmitted to apparatus 100 via a USB Type C connector.

In some examples, the message may include a Host Based Media Access Control Address (HBMA). As used herein, a Media Access Control (MAC) address refers to a unique identifier assigned to a network interface. The MAC address may be used to facilitate communications between network interfaces. For example, apparatus 100 may have a unique MAC address and the host computing device may have an HBMA. As used herein, an HBMA refers to the MAC address of the host computing device.

In some examples, the HBMA may be included on a whitelist of MAC addresses of a network. Presence on a whitelist may allow an entity access to service, access, or recognition on the network. In some examples, entities on the whitelist may be identified by their particular MAC address. Thus, a host computing device with an HBMA on the whitelist may be allowed access, service, or recognition on the network.

Instructions 108, when executed by processing resource 102, may cause the processing resource to configure the apparatus using the HBMA. In some examples, instructions 108 may be executed by processing resource 102 in response to a determination that the apparatus is in a particular operating mode. As used herein, a particular operating mode refers to an operating mode of apparatus 100 which includes a conditional enablement of a network controller on apparatus 100. As used herein, a network controller refers to hardware that interfaces with a device. A network controller may be a chip, an expansion card, or a stand-alone device, among others. In some examples, a network controller may facilitate interfacing between two elements of a device, such as a memory resource and a processing resource of the device. In other examples, a network controller may facilitate interfacing between a device and a second, external device. For instance, a network controller may facilitate interfacing between a host computing device and a peripheral device.

In some examples, apparatus 100 may further include instructions executable to enable the network controller of apparatus 100 in response to a determination that apparatus 100 is in the particular operating mode and a determination that the message received from the host computing device at apparatus 100 includes an HBMA. As used herein, enabling the network controller of apparatus 100 refers to providing power and functionality to the network controller. When the network controller is enabled, the network controller may be able to interface with apparatus 100 and/or with the host computing device.

In some examples, apparatus 100 may further include instructions executable to refrain from enabling the network controller of apparatus 100 in response to the determination that apparatus 100 is in the particular operating mode and a determination that the message received from the host computing device at apparatus 100 does not include an HBMA. When the network controller is not enabled, power and functionality are not provided to the network controller. Thus, the network controller is not going to interface with apparatus 100 and/or with the host computing device.

In some examples, instructions 108 may include instructions to overwrite a MAC address of the apparatus 100. That is, instructions 108 may include instructions to substitute an associated MAC address with a different address. In some examples, instructions 108 may include instructions to overwrite the MAC address of apparatus 100 with the HBMA associated with the host computing device. Said differently, instructions 108 may include instructions to substitute the HBMA of the host computing device for the MAC address of the apparatus 100. As a result, apparatus 100 may have a MAC address that is the same as the HBMA associated with the host computing device.

Instructions 108 may further include instructions to power up a Network Interface Controller (NIC) of the apparatus 100 using the HBMA. As used herein, a NIC refers to a hardware component that connects a computing device to a network. The NIC may include electronic circuitry to receive signals and allow the computing device to communicate with other devices on the network. In some examples, powering up a NIC of the apparatus 100 using the HBMA may include providing power and functionality to the NIC. In addition, providing functionality to the NIC using the HBMA may aid other devices on the network, such as the host computing device, in determining that the apparatus 100 is a trusted apparatus such that the host computing device may interface with apparatus 100. As described previously, the HBMA may be included on a whitelist of MAC addresses. Thus, powering up the NIC using the HBMA may allow the apparatus 100 to be included on the whitelist and thus enable service, access, and recognition with the network.

Figure 2:
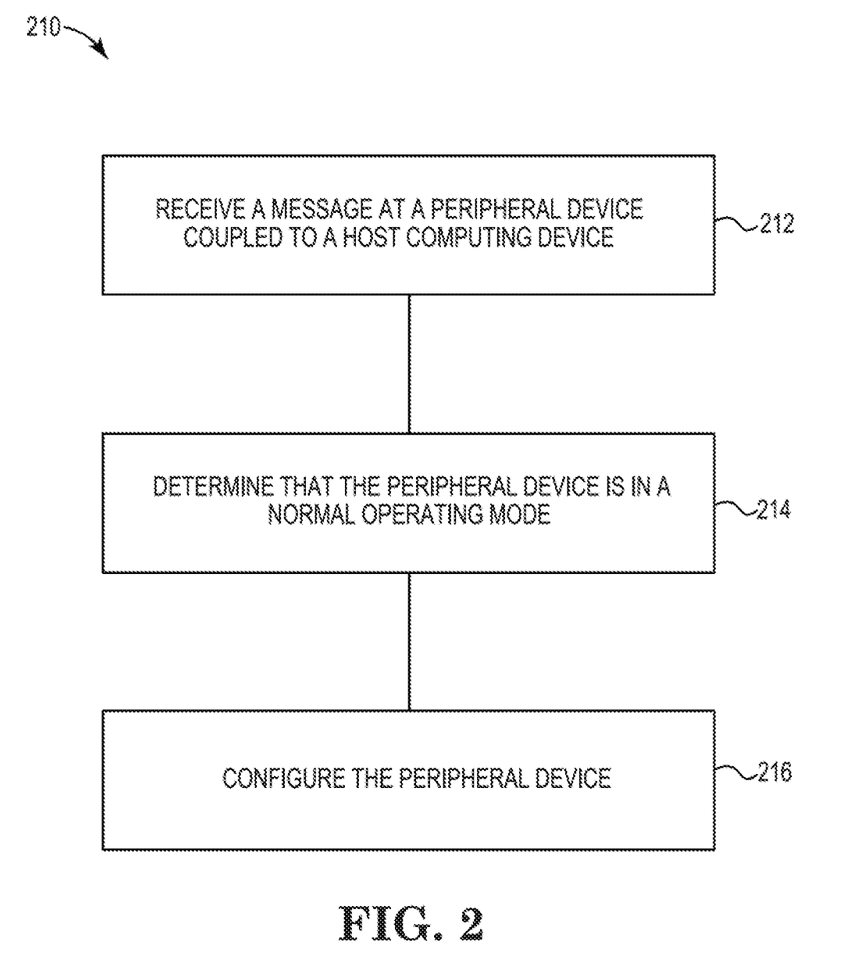
FIG. 2 is an example method for operating mode configuration consistent with the disclosure.

FIG. 2 is an example method 210 for operating mode configuration consistent with the present disclosure. At 212, method 210 may include receiving a message at a peripheral device. The peripheral device may be akin to apparatus 100, discussed with respect to FIG. 1. As described previously, a peripheral device may be included within an auxiliary device, such as a dock. In some examples, the peripheral device may be coupled to a host computing device.

Receiving a message at a peripheral device at 212 may include receiving a message from the host computing device. In some examples, the message may include an HBMA of the host computing device. That is, in some examples, the peripheral device may receive a message from the host computing device at 212, and the message may include an HBMA. In other examples, the message may not include an HBMA of the host computing device. That is, in such examples, the message received by the peripheral device at 212 may not include an HBMA.

At 214, method 210 may include determining that the peripheral device is in a normal operating mode. As used herein, a normal operating mode refers to an operating mode in which elements of the peripheral device including a network controller on the peripheral device are to engage. In some examples, determining that the peripheral device is in a normal operating mode at 214 may include determining that a network controller on the peripheral device is to engage in response to the peripheral device being coupled to the host computing device, in some examples, determining that the peripheral device is in a normal operating mode at 214 may further include transmitting power to the network controller on the peripheral device in response to the peripheral device being coupled to the host computing device and in response to the determination is in the normal operating mode. That is, determining that the peripheral device is in a normal operating mode at 214 may include providing power and functionality to the network controller in response to the peripheral device being coupled to the host computing device and the peripheral device being in the normal operating mode.

At 216, method 210 may include configuring the peripheral device. In some examples, configuring the peripheral device at 210 may include configuring the peripheral device based on the message received at 212 and the determination that the peripheral device is in the normal operating mode made at 214. Configuring the peripheral device at 216 may occur subsequent to the network controller being powered as part of the determination that the peripheral device is in a normal operating mode made at 214.

In some examples, configuring the peripheral device at 216 may include determining that the message received at 212 included an HBMA. In response to the determination that the message received at 212 included an HBMA, configuring the peripheral device at 216 may include overwriting a MAC address of the peripheral device with the HBMA. As described with respect to FIG. 1, overwriting a MAC address of the peripheral device with the HBMA may include substituting the HBMA for the MAC address of the peripheral device. The MAC address may be overwritten with the HBMA at the network controller of the peripheral device.

In some examples, configuring the peripheral device at 216 may include determining that the message received at 212 did not include an HBMA. In response to the determination that the message received at 212 did not include an HBMA, configuring the peripheral device at 216 may include enabling a MAC address of the peripheral device. The MAC address may be enabled at the network controller of the peripheral device. In such examples, the MAC address of the peripheral device may be different than the HBMA of the host computing device. As described with reference to FIG. 1, the HBMA may be included on a whitelist such that the host computing device may be recognized and have service on and access to the network. However, the MAC address of the peripheral device may not be included on the whitelist, thus, the peripheral device may experience reduced access and service to the network. Said differently, configuring the peripheral device at 216 by enabling the MAC address of the peripheral device may result in the host computing device and/or network failing to recognize the peripheral device as a trusted device.

Figure 3:
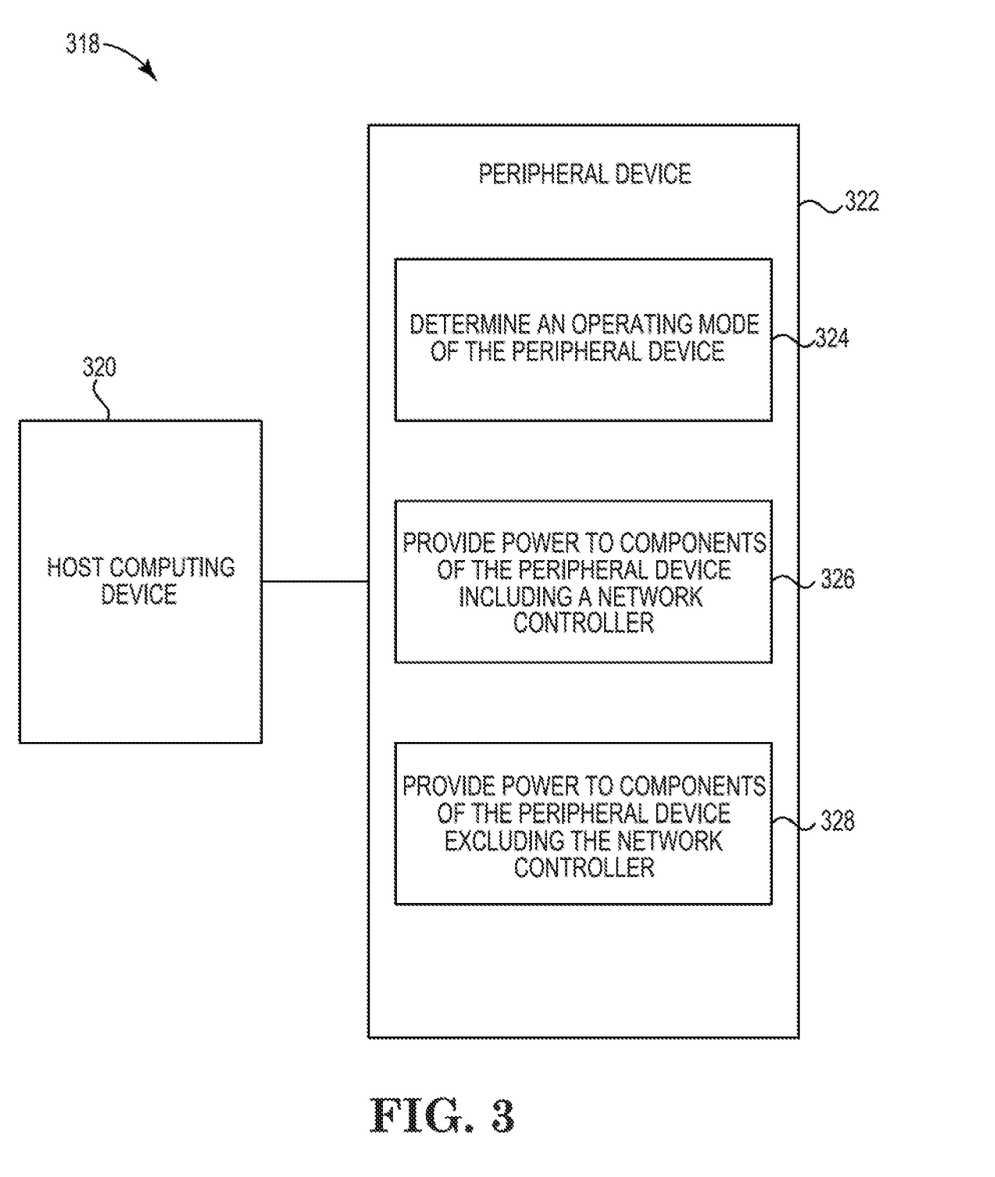
FIG. 3 is an example system for operating mode configuration consistent with the disclosure.

FIG. 3 is an example system 318 for operating mode configuration consistent with the disclosure. System 318 may include a host computing device 320. As described previously, host computing device 320 may refer to a device including a processing resource, memory, and input/output interfaces for wired and/or wireless communication and may be a laptop computer, a desktop computer, a mobile device, and/or other wireless devices, although examples of the disclosure are not limited to such devices. System 318 may further include a peripheral device 322. Peripheral device 322 may be a USB Type C device. In some examples, peripheral device 322 may be a docking device. In such examples, peripheral device 322 may dock to the host computing device 320. As shown in FIG. 3, the peripheral device 322 may be coupled to the host computing device 320.

At 324, peripheral device 322 may determine an operating mode of the peripheral device 322. In some examples, the peripheral device 322 may determine its operating mode at a controller on the peripheral device 322. In some examples, the peripheral device 322 may be in a first operating mode. The first operating mode may be akin to the particular operating mode described with respect to FIG. 1. That is, the first operating mode may include a conditional enablement of a network controller on the peripheral device 322. In some examples, determining an operating mode of the peripheral device 322 may include determining that a policy setting corresponding to the first operating mode is enabled within firmware of the peripheral device 322. As used herein, a policy setting refers to a set of instructions that may be selectively enabled or disabled. When a policy setting is enabled, the device including the policy setting may perform the instructions specified by the policy setting. Conversely, when a policy setting is disabled, the device including the policy setting may refrain from performing the instructions specified by the policy setting. In some examples, the first operating mode of the peripheral device 322 may correspond to an enablement of a policy setting. In such examples, the policy setting may correspond to the conditional enablement of the network controller on the peripheral device 322. In some examples, the policy setting may correspond to the state (e.g. enabled or disabled) of a non-volatile memory resource within the peripheral device. In some examples, the policy setting may correspond to a physical switch within the peripheral device.

At 326, the peripheral device 322 may provide power to components of a peripheral device. In some examples, peripheral device 322 may provide power to a network controller of the peripheral device 322. Providing power to components of a peripheral device 322 at 326 may occur in response to a receipt of a message at the peripheral device. In some examples, the message may originate at the host computing device 320 and may include an HBMA of the host computing device 320.

Providing power to components of the peripheral device 322 including the network controller at 326 may further include overwriting a MAC address of the peripheral device 322. In some examples, the MAC address of the peripheral device 322 may be overwritten with the HBMA such that the peripheral device 322 has the same MAC address as host computing device 320. As described previously with respect to FIG. 1, overwriting the MAC address of the peripheral device 322 at the network controller may allow the peripheral device access to and service on the network because the HBMA may be recognized as a trusted MAC address.

At 328, peripheral device 322 may provide power to components of the peripheral device 322. In some examples, providing power to components of the peripheral device 322 at 328 may include providing power to components of the peripheral device 322 excluding the network controller. That is, providing power to components of the peripheral device 322 at 328 may include providing power to a subset of components of the peripheral device 322, where the subset does not include the network controller of the peripheral device 322. In some examples, providing power to components of a peripheral device 322 excluding the network controller at 328 may occur in response to receipt of a message at peripheral device 322 that does not include an HBMA. Said differently, in response to receiving a message that does not include an HBMA address, peripheral device 322 may power some components of the peripheral device 322 but may not power the network controller.

In some examples, peripheral device 322 may determine that the peripheral device 322 is in a second operating mode. The second operating mode may correspond to the normal operating mode described with respect to FIG. 2. In some examples, the peripheral device 322 may determine that a policy setting within the peripheral device 322 is not enabled. In such examples, the peripheral device 322 may be determined to be in the second operating mode when the policy setting is not enabled. In response to the determination that the peripheral device 322 is in the second operating mode, peripheral device 322 may further provide power to components of the peripheral device 322 including the network controller. In some examples, the peripheral device 322 may have power provided to components including the peripheral device in response to a determination that the peripheral device 322 is coupled to host computing device 320.

Peripheral device 322 may overwrite the MAC address of the peripheral device 322 when the peripheral device 322 is in the second operating mode. In some examples, the MAC address of the peripheral device 322 may be overwritten in response to receipt of a message from the host computing device 320. The message may include an HBMA of the host computing device 320. In such examples, peripheral device 322 may overwrite the MAC address of the peripheral device 322 in response to a determination that the message received from host computing device 320 includes an HBMA. As described previously, overwriting the MAC address with the HBMA may include substituting the HBMA for the MAC address of the peripheral device 322.

Figure 4:
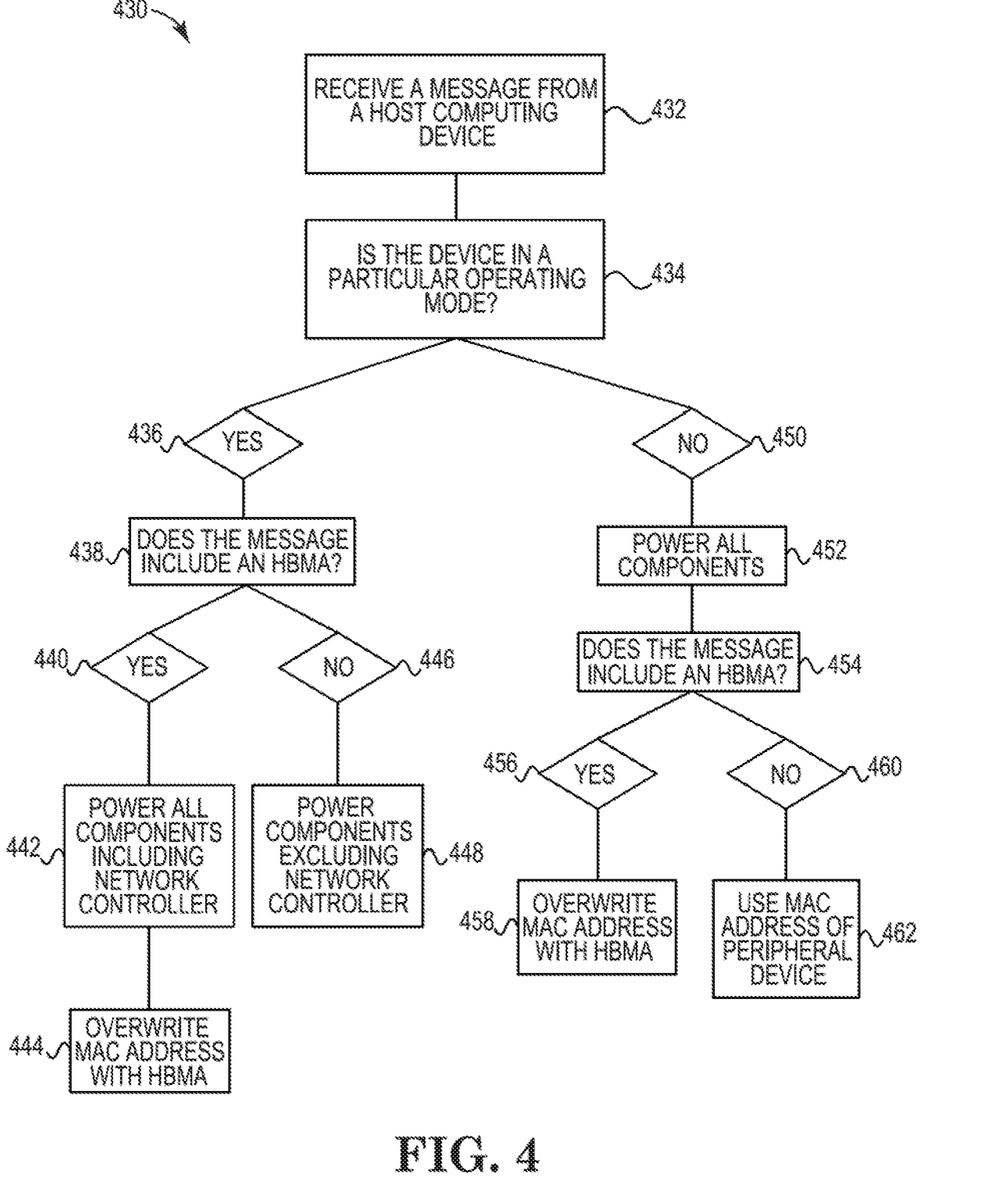
FIG. 4 is another example method for operating mode configuration consistent with the disclosure.

FIG. 4 is another example method 430 for operating mode configuration consistent with the present disclosure. At 432, a peripheral device may receive a message from a host computing device. The peripheral device may be akin to apparatus 100 and/or peripheral device 322, discussed previously with respect to FIGS. 1 and 3, respectively. The host computing device may be akin to host computing device 320, discussed with respect to FIG. 3.

At 434, a determination may be made as to whether peripheral device is in a particular operating mode. The particular operating mode may be akin to the particular operating mode discussed with respect to FIG. 1 and/or to the first operating mode discussed with respect to FIG. 3. If the peripheral device is determined to be in the particular operating mode at 434, the flow diagram 430 may move to the "yes" box 436.

Based on the "yes" determination at 436, a determination may be made at 438 as to whether the message received at 432 included an HBMA. If the message received at 432 did include an HBMA message ("yes" box 440), all components of the peripheral device may be powered at 442. Powering the components at 442 may include providing power to a network controller of the peripheral device. Once the components of the peripheral device are powered at 442, a MAC address of the peripheral device may be overwritten with the HBMA at 444. In some examples, the HBMA may come from the message received at 432. As described previously, overwriting the MAC address of the peripheral device with the HBMA at 444 may allow the peripheral device to receive service and access to a network because the HBMA may be included on a whitelist of trusted MAC addresses.

If the message received at 432 does not include an HBMA, a "no" answer may be given at 446 in response to the determination of whether the message includes an HBMA made at 438. In response to a "no" answer at 446, the peripheral device may provide power to some of the components at 448. However, power may not be provided to the network controller at 448. Said differently, a "no" answer at 446 may result in a subset excluding the network controller being powered at 448. This may result in only a portion of the functionality of the peripheral device corresponding to the powered components being enabled.

If, however, the peripheral device is not determined to be in the particular operating mode at 434, the flow diagram 430 may move to the "no" box 450. In response to the determination that the peripheral device is not in the particular operating mode, components of the peripheral device may be powered at 452. In some examples, powering components of the peripheral device at 452 may include powering the network controller of the peripheral device.

Once the components of the peripheral device have been powered at 452, a determination may be made at 454 as to whether the message received at 432 includes an HBMA. Unlike when the peripheral device is in the particular operating mode, the determination made at 454 may be made after the peripheral device has been powered at 452. That is, when the peripheral device is not in the particular operating mode, the components of the peripheral device may be powered at 452 prior to a determination being made at 454 as to whether the message included an HBMA.

If the message is determined at 454 to include an HBMA ("yes" at 456), the MAC address of the peripheral device may be overwritten with the HBMA at 458. As described previously, overwriting the MAC address of the peripheral device with the HBMA at 458 may allow the peripheral device to receive access and service to the network.

If, however, the message is determined at 454 to not include an HBMA ("no" at 460), the MAC address of the peripheral device may be used at 462. That is, the MAC address of the peripheral device may not be overwritten. In such examples, the MAC address of the peripheral device may not match the HBMA of the host computing device. As described previously, using the MAC address of the peripheral device as opposed to overwriting the MAC address with the HBMA may result in the peripheral device not receiving full access to and service on the network because the MAC address of the peripheral device may not be recognized as a trusted MAC address. Said differently, using the MAC address of the peripheral device at 462 may result in the peripheral device having a diminished functionality because the MAC address of the peripheral device may not be part of the whitelist, while the HBMA address may be part of the whitelist.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:
1. An apparatus, comprising:
   a memory resource storing executable instructions; and
   a processing resource to execute the instructions stored on the memory resource to:

receive a message from a host computing device coupled to the apparatus, wherein the message includes a Host Based Media Access Control Address (HBMA);

overwrite a Media Access Control (MAC) address of the apparatus with the HBMA, wherein the HBMA is different than the MAC address of the apparatus and is a whitelist address;

access a network controller using the HBMA in response to a determination that the apparatus is in a particular operating mode that includes a conditional enablement of the network controller on the apparatus and is based on an enabled policy setting within firmware of the apparatus;

provide power and functionality to the network controller in response to a message including the whitelist HBMA being received at the apparatus; and refrain from providing power and functionality to the network controller in response to a message without the whitelist HBMA being received at the apparatus.

2. The apparatus of claim 1, wherein the instructions executable to configure the apparatus using the HBMA further comprise instructions executable to power up a Network Interface Controller (NIC) of the apparatus using the HBMA.

3. A method, comprising:

receiving a message at a peripheral device coupled to a host computing device, wherein the message includes a Host Based Media Access Control Address (HBMA);

determining that the peripheral device is in a particular operating mode that includes a conditional enablement of a network controller on the peripheral device and is based on an enabled policy setting within firmware of the peripheral device;

overwriting a Media Access Control (MAC) address of the peripheral device with the HBMA, wherein the HBMA is different than the MAC address of the peripheral device and is a whitelist address; and accessing, via a peripheral device, the network controller using the HBMA based on the message and the determination that the peripheral device is in the particular operating mode;

providing power and functionality to the network controller in response to a message including the whitelist HBMA being received at the apparatus;

refraining from providing power and functionality to the network controller in response to a message without the whitelist HBMA being received at the apparatus; and powering up a Network Interface Controller (NIC) of the apparatus using the whitelist HBMA.

4. The method of claim 3, further comprising determining that the peripheral device is in a normal operating mode when the network controller on the peripheral device is to engage in response to the peripheral device being coupled to the host computing device.

5. The method of claim 4, further comprising transmitting power to the network controller on the peripheral device in response to the peripheral device being coupled to the host computing device and the determination that the peripheral device is in the normal operating mode.

6. A system, comprising:

a host computing device; and a peripheral device coupled to the host computing device, the peripheral device to:

determine an operating mode of the peripheral device; and in response to a determination that the peripheral device is in a first operating mode that includes a conditional enablement of a network controller that is a component of the peripheral device and is based on an enabled policy setting within firmware of the peripheral device:

provide power to components of the peripheral device including the network controller using a Host Based Media Access Control Address (HBMA) that is a whitelist address in response to receipt of a message including the whitelist HBMA from the host computing device and overwrite a Media Access Control (MAC) address of the peripheral device with the whitelist HBMA at the network controller; and provide power to components of the peripheral device excluding the network controller in response to receipt of a message not including the whitelist HBMA from the host computing.

7. The system of claim 6, further comprising the peripheral device to:

provide power to components of a peripheral device including a network controller in response to a determination that the peripheral device is in a second operating mode; and overwrite the MAC address of the peripheral device with the whitelist HBMA at the network controller in response to the determination that the message included the whitelist HBMA.

8. The system of claim 6, further comprising the peripheral device to determine that a policy setting corresponding to the first operating mode is enabled within hardware of the peripheral device.

9. The system of claim 8, further comprising the peripheral device to determine that a policy setting of the peripheral device is not enabled within at least one of the firmware and the hardware, wherein the peripheral device is in the second operating mode when the policy setting is not enabled.

10. The system of claim 6, wherein the peripheral device is a docking device to dock to the host computing device.

11. The system of claim 6, wherein the peripheral device is further to power up a network interface controller (NIC) of the peripheral device using the whitelist HMBA.

12. The system of claim 6, wherein the whitelist HBMA is different than the MAC address.

\* \* \* \* \*